United States Patent [19]

White

[11] 4,313,174

[45] Jan. 26, 1982

[54] ROM-BASED PARALLEL DIGITAL ARITHMETIC DEVICE

[75] Inventor: Stanley A. White, Santa Ana, Calif.

[73] Assignee: Rockwell International Corporation, El Segundo, Calif.

[21] Appl. No.: 130,653

[22] Filed: Mar. 17, 1980

[51] Int. Cl.³ .................... G06F 7/544; G06F 7/552
[52] U.S. Cl. .................................... 364/753; 364/757
[58] Field of Search ................... 364/753, 757, 754

[56] References Cited

U.S. PATENT DOCUMENTS

| | | | |
|---|---|---|---|
| 3,610,906 | 10/1971 | Stampler | 364/757 |
| 3,749,898 | 7/1973 | Logan | 364/757 |
| 3,917,935 | 11/1975 | Lazecki | 364/761 |

OTHER PUBLICATIONS

Jayashree et al. "On Binary Multiplication Using the Quarter Square, Algorithm", *IEEE Trans-on Computers*, Sep. 1976, pp. 957-960.
Caplener et al "High-Speed Parallel Digital Multiplier", *IBM Technical Disclosure Bulletin* vol. 12, No. 5, Oct. 1969, p. 685.
Singh "Binary Multiplier Circuit Using Read-Only Memory", *IBM Tech. Disclosure Bulletin* vol. 14, No. 10, Mar. 1972, pp. 2981-2982.

*Primary Examiner*—David H. Malzahn
*Attorney, Agent, or Firm*—H. Fredrick Hamann; Rolf M. Pitts

[57] ABSTRACT

A fully-parallel digital arithmetic device for obtaining the square, $C^2$, of a value, C, via parts of the value C and involving a reduction in memory requirements. Three square function ROM's are employed, one responsive to the most significant-bits half of a parallel input, the second ROM responsive to the least-significant bits half of the parallel input, and the third one responsive to the sum of said most significant bits and least-significant bits. The outputs of the square function ROM's are then combined and scaled to effect a square by parts of the applied input value, C. A pair of such arithmetic devices may be advantageously combined to economically effect the product AB of two values, A and B, in the manner of a quarter square multiplier.

23 Claims, 13 Drawing Figures

ROM-BASED PARALLEL DIGITAL ARITHMETIC DEVICE

CO-PENDING APPLICATIONS

1. U.S. Patent Application Ser. No. 092,387, filed Nov. 8, 1979, by S. A. White for Simplified Fast Fourier Transform Butterfly Arithmetic Unit.

BACKGROUND OF THE INVENTION

The field of the invention relates to digital arithmetic means, and more particularly to digital arithmetic means employing parallel digital coding for obtaining the square of a number of value.

In the digital multiplication of two numbers, a variety of schemes has evolved in the digital processor art. A survey of some of these is treated in the text "Digital Signal Processing" by Peled and Liu, published by John Wiley and Sons, Inc., New York (1976). For example, a 2's complement type of serial multiplier is illustrated in FIG. 4.3 in Section 4.2, Binary Arithmetic, while FIG. 4.4 illustrates a 4-bit array multiplier as a means of speeding up the serial multiplier process, but which yet requires a substantial number of operations and corresponding processing time. Page 182 in such Section 4.2 discusses a "two bits at a time" or "N-bits at a time" as an alternate method for speeding up multiplication. FIG. 4.4 of Section 4.1 of the above-noted reference "Digital Signal Processing" illustrates a 4-bit array multiplier by which the partial products of all the bits are generated and added up. However, all of these methods involve substantial delays or processing time and associated gating hardware.

The current availability of miniaturized read-only memories, or ROM's, has allowed a change in the approach to digital multiplier mechanizations, whereby the multiplication of two numbers may be reduced to use of a set of look-up tables in memory: the product of any two values may be quickly determined by addressing the memory (ROM) by means of such set of values and "looking up" or reading out the answer stored at such address. Thus, the number of products obtainable is limited by the word size of the two values-to-be-multiplied and the size or capacity of the memory. In other words, the capacity of the memory imposes limits on the number of products which may be stored and addressed as a function of the address-word size.

In commercial practice, the size of chips (upon which memory cells may be mounted) tends to be standardized, while the density of memory cells that may be placed on a chip is limited.

A method of reducing the memory size required for a given size ROM type multiplier has been described in the article "A Specially Designed ROM for Multiplication", by C. van Holten, published in *Microelectronics*, Vol. 9, No. 1 at pp 25–26, published by Mackintosh Publications, Ltd., 1978). Such reference discloses the utilization of auxiliary logic (a comparator and zero detector) in conjunction with the ROM, and employing the concepts that the product of $A \times B$ is the same as that of $B \times A$ and for either A or B equal to zero, the product AB is zero. Thus, the zero detector commands a zero product output without referencing or addressing the ROM, while the comparator routes the larger of A and B to a major side of an abbreviated memory matrix, the redundant portion of the matrix being omitted from the memory. While the economy achieved is better than 50%, such result is not significant in terms of the mechanization demands made by current highly sophisticated, high-density digital-data processors.

BRIEF DESCRIPTION OF THE INVENTION

By means of the concept of the invention, the above-noted limitations of the prior art are avoided and there is provided method and apparatus for substantially reducing the required memory to effect a multiplier of a given capacity or arithmetic size.

In a preferred embodiment of the invention, there is provided a fully parallel quarter-square multiplier, employing two sets of square-function ROM's, each responsive to a respective one of the two values A and B. Each such set of ROM's is arranged to cooperate as a fully parallel digital-arithmetic device for obtaining the square of a value via parts thereof. By means of such method a first one of the square function ROM's is responsive to the most-significant-bits half of a parallel input, the second ROM is responsive to the least-significant-bits half of the parallel input, and the third ROM responsive to the sum of the two input halves. A square by parts is effected by combining and scaling the outputs of the three ROM's, by which substantial economies in required memory, processing time, power and energy are obtained.

Accordingly, it is an objective of the present invention to provide a fully parallel ROM-based digital-arithmetic device.

It is another object of the invention to provide digital arithmetic means of improved engineering economy for generating the square of a value by parts thereof.

A still further object is to provide a highly efficient digital quarter-square multiplier based on a square-by-parts technique.

Yet another object is to provide a highly useful digital arithmetic device for the improvement of complex multipliers, including applications to FFT-butterfly arithmetic.

These and other objects of the invention will become apparent from the following description, taken together with the accompanying drawings in which:

DESCRIPTION OF THE DRAWINGS

In the figures, like reference characters refer to like parts.

DESCRIPTION OF THE PREFERRED EMBODIMENTS

Figure 1:
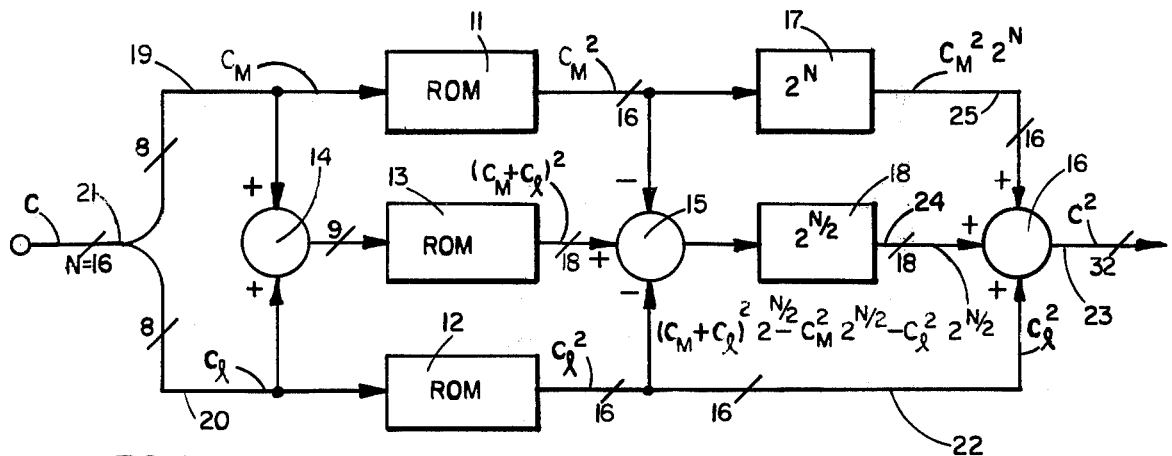
FIG. 1 is a block diagram of a digital arithmetic device embodying the square-by-parts concept of the invention.

Referring now to FIG. 1, there is illustrated in block diagram form one aspect of the invention, namely a fully parallel digital arithmetic device for obtaining the square, $C^2$, of a value, C. As illustrated, the device of FIG. 1 and 16 parallel inputs (corresponding to $2^{16}$ or 65,536 unsigned addresses), although the concept of the invention is not so limited and any even number of unsigned addresses may be used. (Although the square of a number is positive, whereby a sign designator is not to be contemplated, yet a modification is required in the case of a signed number which is expressed as 2's complement, as discussed later herein.)

There are provided three square function read-only memories (ROM's) 11, 12 and 13. A read address or input of first ROM 11 and an input of a first digital summing means 14 are commonly coupled to a most-significant bits (MSB) half 19 of the parallel input 21 of the digital arithmetic device of FIG. 1. A read address of second ROM 12 and a second input of first digital summer 14 are commonly coupled to the least significant bit (LSB) half 20 of input 21. A read address of third ROM 13 is responsively coupled to the output of element 14, whereby ROM 13 is responsive to the sum of the MSB input 19 and LSB input 20.

There is also provided, in the arrangement of FIG. 1, second and third digital combining means 15 and 16, each having a first, second and third input and an output. Each of the inputs of element 15 is responsively coupled to a mutually exclusive one of the read-outs of ROM's 11, 12 and 13, for providing an output indicative of the difference between the read-out of ROM 13 and the sum of the read-outs of ROM's 11 and 12. Each of the three inputs of third digital combining means 16 is input coupled to a mutually exclusive one of the read-outs of ROM's 11, 12 and 13 to provide an output 23 indicative of the sum of the inputs thereto.

There is further provided in the arrangement of FIG. 1, respective gain-scaling means 17 and 18, interposed at the respective input to element 16 from element 11 and element 15, respectively. As illustrated first gain scaling means 17 provides a gain-scaling or factor of $2^N$ for the input 25 to element 16 from ROM 11, and second gain-scaling means 18 provides a gain-scaling or factor of $2^{N/2}$ for the input 24 to element 16 from element 15, where N corresponds to the number of parallel inputs. For the embodiment in FIG. 1, N=16. Alternatively, such relative gain-scaling among the three inputs to element 16 may be obtained by commonly reducing or attenuating the relative gains of all three inputs by the factor $2^{-N}$. In this way, the relative gain for line 25 becomes $2^{N/N}$ or $2^0$ or unity, the relative gain on line 24 becomes $2^{N \cdot 1/2 \cdot N}$ or $2^{-N/2}$, and the gain-scaling to be inserted in line 22 would be $2^{-N}$.

In normal operation of the illustrated arrangement of FIG. 1, a value C applied to the 16-bit parallel digital input 21 is treated as a first partial (MSB) input, $C_M$ (corresponding to the most significant bits half of the C input) and second partial (LSB) input, $C_I$ (corresponding to the remaining or least significant bits half of the value C). One may therefore express C as $2^{N/2}C_M+C_I$. The corresponding read-outs from ROM's 11, 12 and 13 are $C_M{}^2$, $C_I{}^2$ and $(C_M+C_I)^2$, respectively. Thus the output of element 15, in response to the applied inputs thereto, becomes $(C_M+C_I)^2-C_M{}^2-C_I{}^2$. Examining the resultant values on input lines 22, 24 and 25 of digital summer 16, the input of line 22 in $C_I{}^2$, that on line 25 is $2^N C_M$, and that on line 24 is $2^{N/2}[(C_M+C_I)^2-C_M{}^2-C_I{}^2]$. The output on line 23 is the sum of the inputs on lines 22, 24 and 25:

$$\text{Output} = 2^N C_M{}^2 + C_I{}^2 + 2^{N/2}[(C_M+C_I)^2 - C_M{}^2 - C_I{}^2] \quad (1)$$

$$\text{Output} = 2^N C_M{}^2 + C_I{}^2 + 2^{N/2}[C_M{}^2 + 2C_M C_I + C_I{}^2 - C_M{}^2 - C_I{}^2] \quad (2)$$

$$\text{Output} = 2^N C_M{}^2 + 2^{N/2} \times 2^1 C_M C_I + C_I{}^2 \quad (3)$$

$$\text{Output} = 2^N C_M{}^2 + 2^{N/2+1} C_M C_I + C_I{}^2 \quad (4)$$

That this output corresponds to the value, $C^2$, may be seen as follows: First, define C as the sum of two component values, A and B, where A corresponds to the value contributed by the MSB half $C_M$ and B corresponds to the value contributed by LSB half, $C_I$:

$$C = A + B \quad (5)$$

where:
$A = 2^{N/2} C_M$ and
$B = C_I$ and
N = the bit size or number of bits of C.
Therefore:

$$C = 2^{N/2} C_M + C_I \quad (6)$$

Squaring:

$$C^2 = [2^{N/2} C_M + C_I]^2 = 2^N C_M{}^2 + 2^{N/2+1} C_M C_I + C_I{}^2 \quad (7)$$

Figure 12:
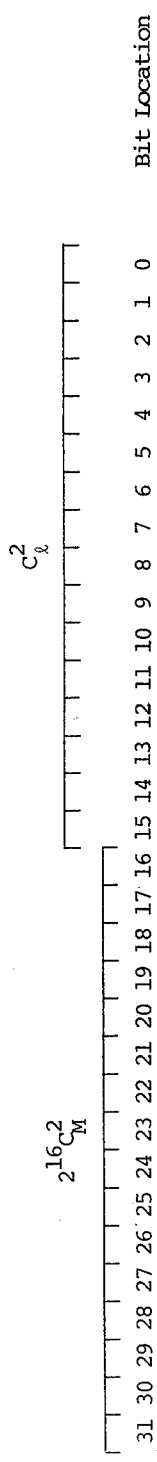
FIG. 12 is a diagrammatic representation of the digital concatenation provided by combining (at adder 16) the outputs of ROM's 11 and 12 in FIG. 1.
Figure 13:
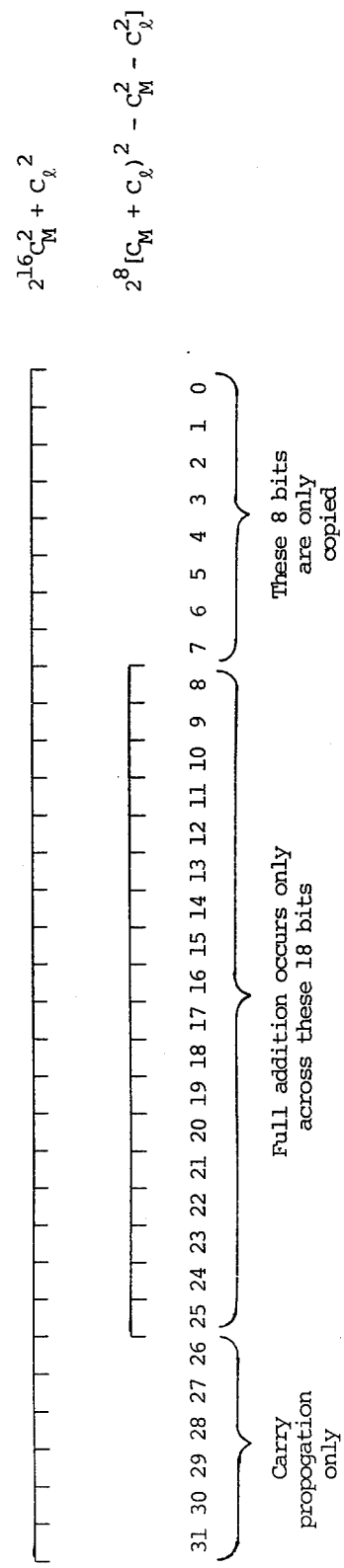
FIG. 13 is a diagrammatic representation of the size of the digital output occurring at adder 16 (in FIG. 1) by combining the output of the central ROM 13 with the digital concatenation (illustrated in FIG. 12) provided by ROM's 11 and 12.

The right hand member of Equation (7) is seen to be identical to that of Equation (4), as to demonstrate that the value on output line 23 in FIG. 1 corresponds to the value $C^2$ in Equation (6), as to illustrate a novel square-by-parts method of mechanization. For the 16 bit input word size (i.e., N=16) 32 bit word size output illustrated in FIG. 1, two ROM's (elements 11 and 12), each require $2^8-1$ or 255 addresses, with 16 bits per address, a total of 255×16 or 4,080 bits per ROM. The center ROM (element 13) requires a $2^9-1$ or 511 addresses with 18 bits per address or a total of 9,198 bits. Thus, the three ROM's represent a memory requirement of only 17,358 bits, one 8-bit wide two-input adder 14, one 16-bit wide three input adder/subtractor 15 and one 3-input 32-bit wide pseudo adder. The top and bottom inputs to adder 16 are illustrated in terms of bit location, per FIG. 12. There is no addition. The bits are concatenated to form a 32-bit word, but there is no actual addition. Now, consider the center input to adder 16, per FIG. 13. Adder 16, therefore, while appearing to be a 3-input 32-bit parallel adder is in fact only an 18-bit parallel adder with additional carries to the top 6 bits. Accordingly, it is to be appreciated that such mechanization is equivalent to a single ROM having $2^{16}$-1 addresses with 32 bits per address, or a total of 2,097,120 bits. It is to be appreciated that the smaller memory requirement of FIG. 1 allows faster operation of the memory search. Also, because such smaller memory requirement is operated as three yet smaller memories in parallel, the memory operation is still faster yet.

Figure 2:
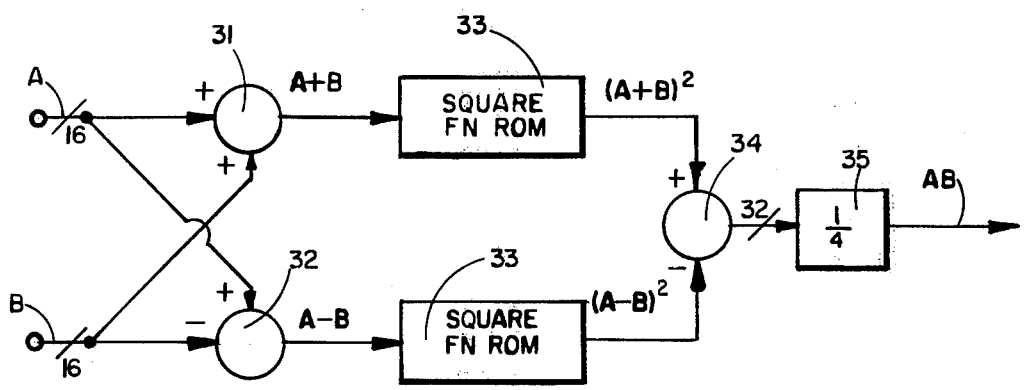
FIG. 2 is a block diagram of a quarter square multiplier in which the concept of the invention may be advantageously employed.

Having disclosed a basic aspect of the invention as a ROM-based fully parallel digital-arithmetic device for efficiently obtaining the square of a value by parts, application of the device may be made to digital multiplication by the quarter-square method of FIG. 2. Such quarter-square multiplier technique in FIG. 2 processes two factors A and B by means of digital combiners 31 and 32 to obtain the values [A+B] and A−B, representing the respective sum and difference thereof.

Each of such combined values are then squared by digital squaring means 33, and the squared values then compared or subtractively combined by digital combiner 34:

$$|A+B|^2 - |A-B|^2 = \qquad (8)$$

$$[A^2 + 2AB + B^2] - [A^2 - 2AB + B^2]$$

$$= A^2 + 2AB + B^2 - A^2 + 2AB - B^2 \qquad (9)$$
$$= 4AB \qquad (10)$$

Figure 3:
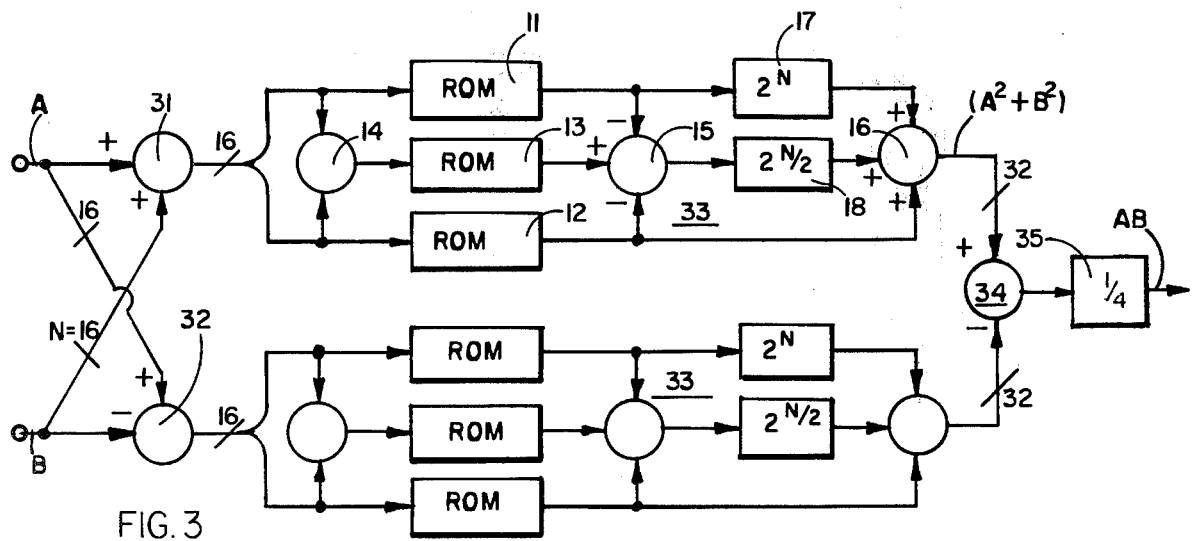
FIG. 3 is a block diagram of the system of FIG. 2 in which the device of FIG. 1 has been applied.
Figure 4:
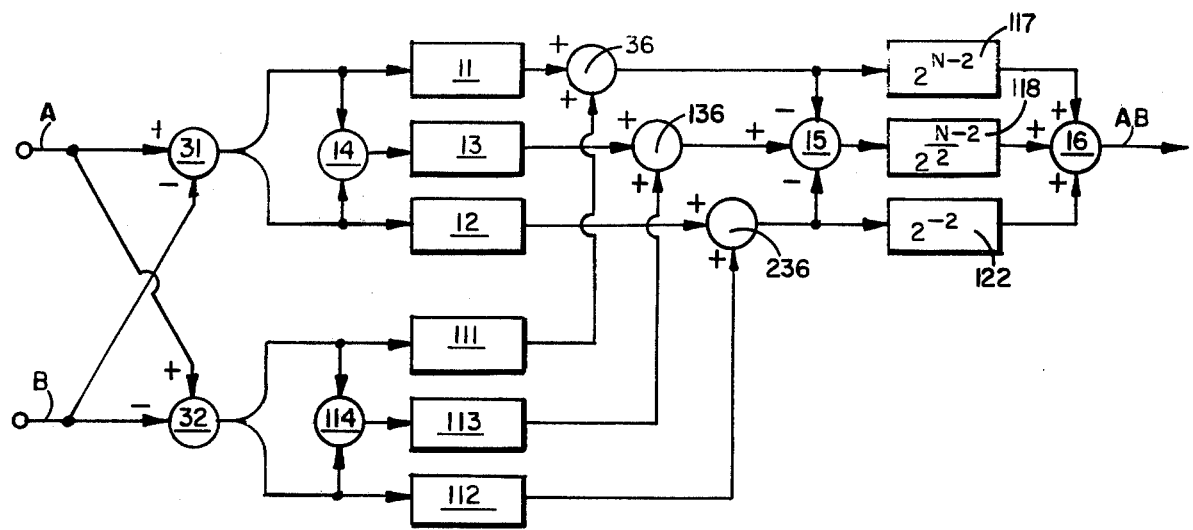
FIG. 4 is a preferred alternate embodiment of the device of FIG. 3.
Figure 5:
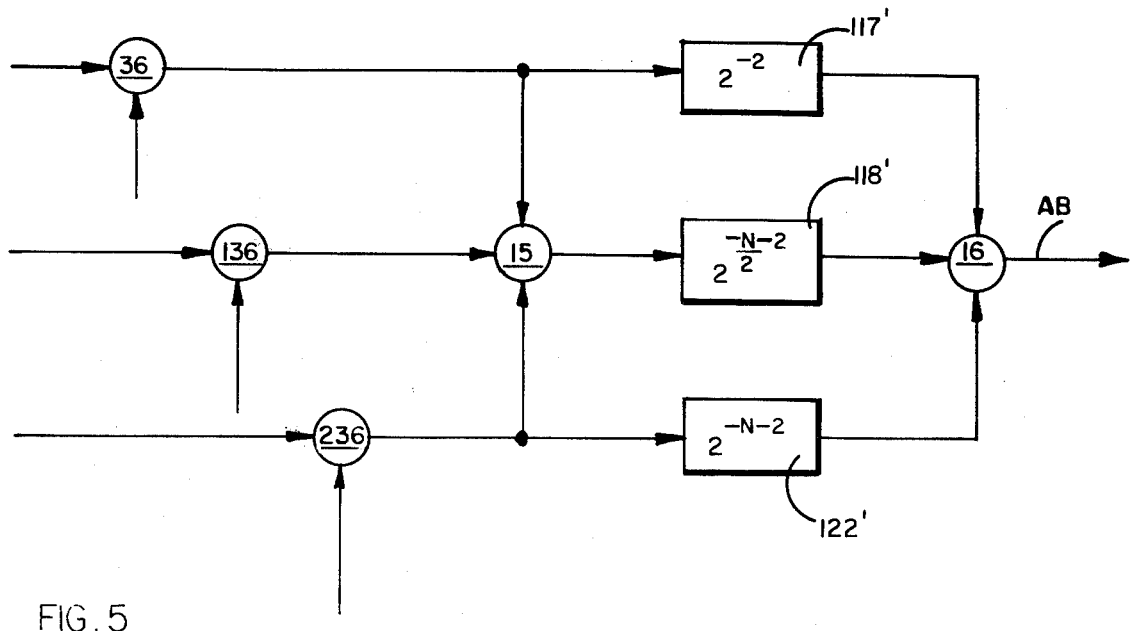
FIG. 5 is a block diagram, illustrating an alternate gain-scaing arrangement for the device of FIG. 4.

The combination, 4AB, may then be suitably scaled or attenuated (by the factor $\frac{1}{4}$) by scaling means 35 to provide the product AB. It is to be appreciated that the device of FIG. 1 may be employed as element 33 in FIG. 2, as shown more particularly in FIG. 3. An economy in organization of the device of FIG. 3 may be effected by combining the outputs of the ROM's of the lower one of multipliers 33 in FIG. 3 with those of the corresponding ones of the upper multiplier, as shown in FIG. 4. Such combining of like ROM's is effected in FIG. 4 by means of adders 36, 136 and 236, as to allow the common use of a single set of elements 15 and 16, and gain channels 117, 118 and 122. Also, the factor $\frac{1}{4}$ or $2^{-2}$, provided by 32 bit element 35 in FIGS. 2 and 4, may be included in the channel scaling provided by the 16-bit elements 117, 118 and 122 in FIG. 4. Thus, the factor $2^N$ becomes $2^{N-2}$, $2^{N/2}$ becomes $2^{N-2}$ and unity or $2^0$ becomes $2^{-2}$. Where the alternate scaling basis for the square function (described above in connection with the description of FIG. 1) is used, i.e., unity, $2^{-N/2}$ and $2^{-N}$, the scaling factor for element 117' in FIG. 5 becomes $2^{0-2}$ or $2^{-2}$, for element 118' $2^{-N/2-2}$ and for element 122' $2^{-N-2}$ as shown in FIG. 5.

Reviewing the operational requirements of the abovedescribed square-by-parts arithmetic processor, additional engineering economies may be effected in the mechanization. Where the input data takes the form of a N-bit unsigned fractional number (e.g., a number always less than 1.0), such number may be expressed as:

$$A = \sum_{n=1}^{N} a_n 2^{-n} \qquad (11)$$

Restricting N to an even number and bisecting A, in a most significant half (MSB) and least significant half (LSB):

$$A_M = \sum_{n=1}^{N/2} a_n 2^{-n} \qquad (12)$$

$$A_l = \sum_{n=1}^{N/2} a_n + \frac{N^{2-n}}{2} \qquad (13)$$

Combining Equations (12) and (13) for A:

$$A = A_M + 2^{-N/2} A_l \qquad (14)$$

Squaring Equation (14):

$$A^2 = A_M^2 + 2^{-N/2}(2A_M A_l) + 2^{-N} A_l^2 \qquad (15)$$

Now, since:

$$2A_M A_l = (A_M + A_l)^2 - (A_M^2 + A_l^2) \qquad (16)$$

the right hand member of Equation (16) may be substituted in Equation (15) and the resultant expression simplified:

$$A^2 = A_M^2 (1 - 2^{-N/2}) + 2^{-N/2}(A_M + A_l)^2 + (2^{-N} - 2^{-N/2}) A_l^2 \qquad (17)$$

Figure 9:
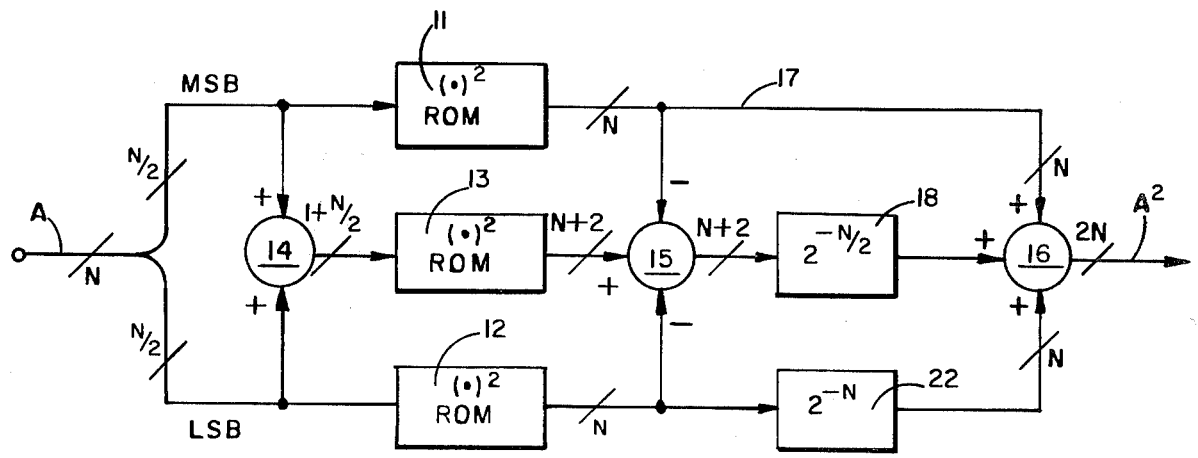
FIG. 9 is a block diagram illustrating the number of lines generally required for a generalized even-numbered N size parallel input to the device of the invention.

The mechanization of such relationship is shown in FIG. 9. It is noted from the block diagram of FIG. 9 that the sizes of the top and bottom ROM's (e.g., elements 11 and 12) are identical: $2^{N/2}$ words×N bits per word, while the size of the center ROM 13 is $2^{1+N/2}$ words×(N+2) bits per word. Such increase in the required size of the center ROM arises from the effect of adding or combining the two half size ($2^{N/2}$) words by summing means 14, as is well understood in the digital processing art. The increase by one in the number of output lines relative to the size of an input to element 14 may be appreciated from considering the binary addition of two like or a pair of binary two-digit numbers:

$$\begin{array}{r} 11 \\ \underline{11} \\ 110 \end{array}$$

the resultant sum being a three digit number.

Figure 7:
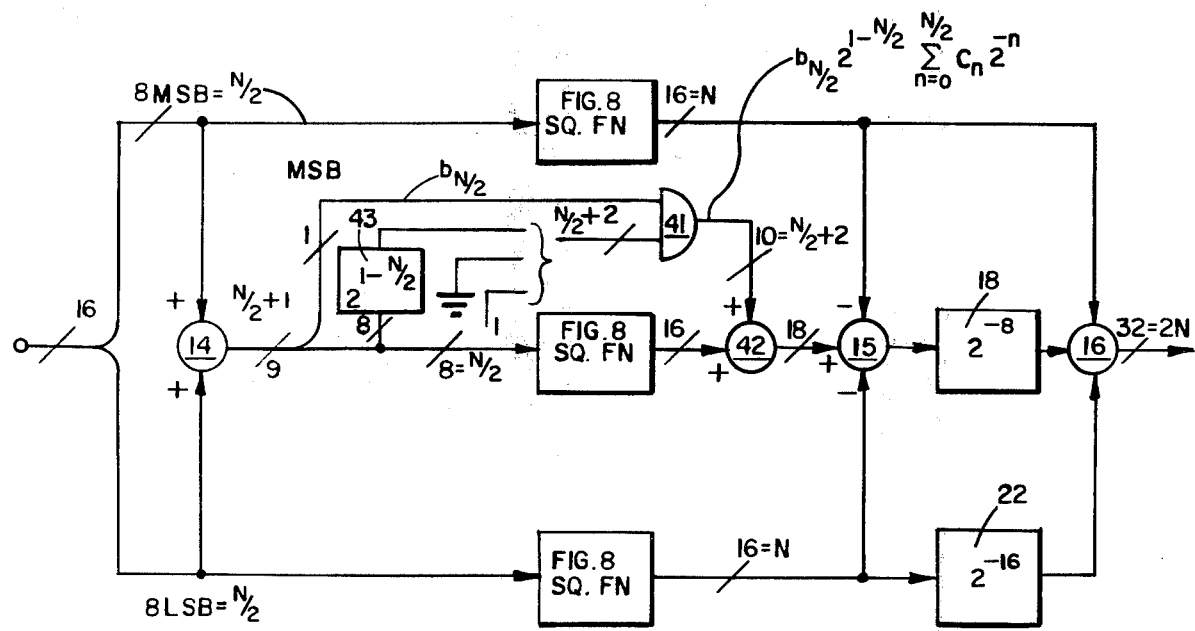
FIG. 7 is a block diagram of the square-by-parts device employed in FIG. 6 and illustrating auxiliary logic means for the center ROM, whereby a uniform ROM design may be employed throughout the device.

For economy in design and production, it is preferrable that a standard single-size ROM be commonly used to perform the function of FIG. 9, and that such standard be based on the smaller size of elements 11 or 12 rather than that of element 13, as shown in FIG. 7.

Referring to FIG. 7, there is illustrated a block diagram of the device of FIG. 9 for a 16-bit word input and in which accommodations have been included for reducing the input size of the central ROM to N/2 bits. In other words, in the arrangement of FIG. 7 like size ROM's are used for all three memories, and the 1+N/2 output from element 14 has been reduced to a N/2 input to the central memory. The means for such accommodation is seen to be a coincidence or AND gate 41 having a first input responsively coupled to a least significant bit line $b_{N/2}$ and a second input coupled to lines N/2, a "0" (ground) input and a "1" input. An output of gate 41 is drivingly coupled to an input of ancillary digital combining means 42, interposed at the output of the central memory. The N/2 lines input to gate 41 is attenuated $2^{1-N/2}$ by gain-scaling element 43. In this way, the arithmetic output of element 42 is always correct, despite the abbreviation of the central ROM.

Figure 8:
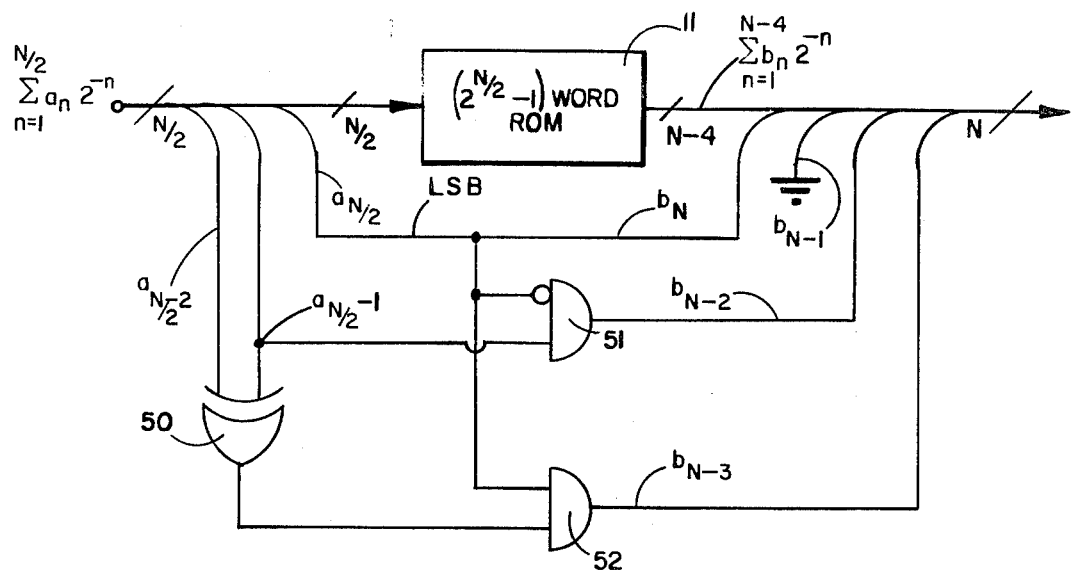
FIG. 8 is a block diagram of a representative one of the uniform ROM's of FIG. 7, illustrating auxiliary logic means by which the memory requirement thereof may be further abbreviated.

With like smaller sized ROM's now employed for the three memories in the square-by-parts device of FIG. 7, a still further reduction may be effected in the size of each of the standard ROM's from a $(2^{N/2}-1)$ word×N bits per word size to $(2^{N/2}-1)$ word×(N−4) bits per word by means of the arrangement of FIG. 8.

Referring now to FIG. 8, there is illustrated an arrangement for a square function ROM in which there is included means for reducing the memory requirements for a square function ROM 11 by four (4) bits per word. There is illustrated in FIG. 8 a N/2 line input, corresponding to a $2^{N/2}$ word input and representing the exemplary 8-bit word input to one of the three memories in FIG. 7.

There are also provided Exclusive-OR gate 50 and coincidence or AND gates 51 and 52. OR gate 50 is coupled to the (N/2-2) and (N/2-1) lines of the N/2 parallel input. The least-significant-bit output line $b_N$ is coupled directly to the least-significant-input line $a_{N/2}$. The next least significant output line $b_{N-1}$ is grounded. Output line $b_{N-2}$ is coupled to the output of gate 51 which gate is in turn responsively coupled to the two least-significant input lines $a_{N/2}$ and $a_{N/2-1}$, to provide a gate output upon the coincidence of $\bar{a}_{N/2}\cdot a_{N/2-1}$. Output line $b_{N-3}$ is coupled to the output of gate 52 which gate is in turn responsively coupled to input line $a_{N/2}$ and the output of OR gate 50. All of the parallel inputs of the N/2-input line are fed to the ROM; the N-4 most-significant parallel outputs of the N-output line are coupled to corresponding (N-4) read-outs of the ROM.

If the binary input data employed by the disclosed arithmetic digital processors were 2's complement signed, rather than unsigned at all, then the input data might be designated as follows:

$$A = -a_0 + \sum_{n=1}^{N} a_n 2^{-n} = -a_0 + M \quad (18)$$

where:

$$a_0 = \text{sign bit}$$

$$M = \sum_{n=1}^{N} a_n 2^{-n}.$$

Thus, the square of the signed value A is:

$$A^2 = (-a_0+M)^2 = (-a_0)^2 - 2a_0M + M^2 \quad (19)$$

where $M^2$ = the value of the unsigned data.

Figure 6:
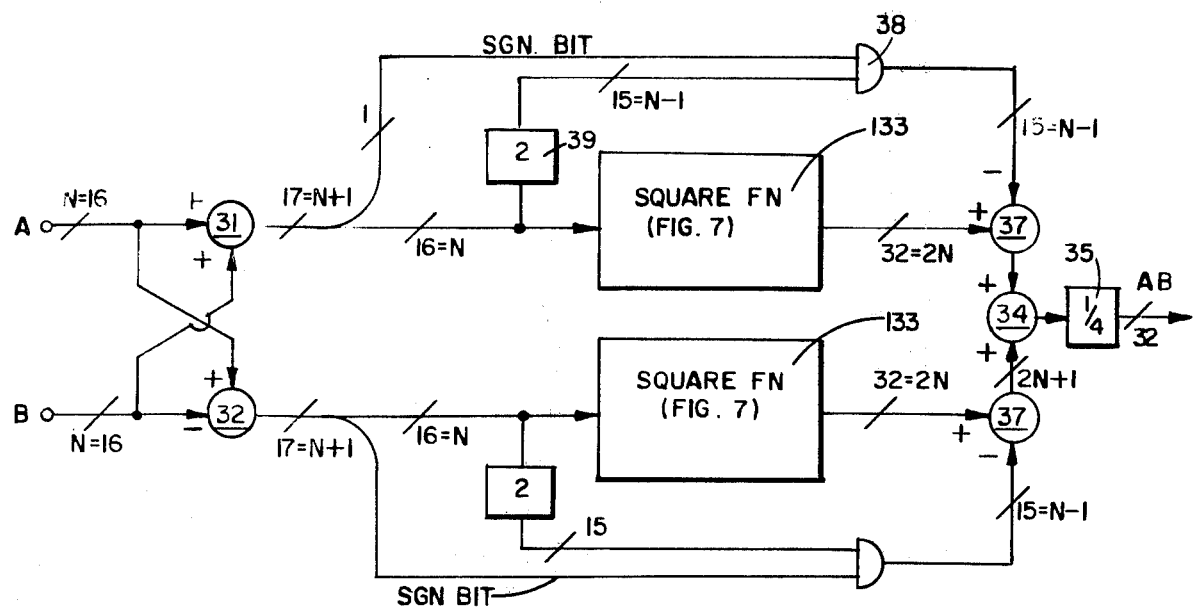
FIG. 6 is a block diagram of the quarter square multiplier of FIG. 2 illustrating means for accommodating a sign bit (as in a 2's complement format) while avoiding doubling of the memory requirement.

The sign bit for the squared data will always be zero (representing a positive sign), because the sign of $A^2$ will always be non-negative. Therefore, the $(-a_0)^2$ designator in Equation (19) can be discarded and the remaining sign designator term in Equation (19) corrected for any negative sign, as shown in FIG. 6. Referring to FIG. 6 there is shown a quarter square multiplier, in which accommodation has been included for discarding the sign bit from a 2's complement signed square function. In such mechanization no $(-a_0)^2$ line is included in the square function memory output, but a coincidence gate 38 responsive to the sign bit and a gain-multiplied value (2M) provided by gain-scale means 39, cooperates with digital subtractor 37, interposed at the output of square function generator 133. In this way the utilization of two's complement coded data need not alter either the size of the ROM's or the number of associated parallel feeds which comprise each of square function generators 133. Referring again to FIGS. 7 and 9, the shrinking of central ROM 13 of FIG. 9 to a like size as ROM's 11 and 12 in FIG. 9 by means of the ancillary logic elements 41, 42 and 43 of FIG. 7 may be treated as follows: Consider the output from digital summer 14 as $A_M + A_I$ (for the fractional values employed):

$$A_M = A_I = \sum_{n=1}^{N/2}(a_n + a_{n+N/2})2^{-n} = \sum_{n=0}^{N/2} b_n 2^{-n} \quad (20)$$

Using an alternate form of notation:

$$A_M + A_I = S + L \quad (21)$$

where:

$S$ = the sum $(A_M + A_I)$ except for the least significant bit, and $L$ = the least significant bit.

Thus, from the right hand member of Equation (20):

$$S = \sum_{n=0}^{\frac{N}{2}-1} b_n 2^{-n} \quad (22a)$$

$$\text{and } L = b_{N/2} 2^{-N/2} \quad (22b)$$

Considering the desired square-function output required of the central ROM, Equation (21) is squared:

$$(A_M+A_I)^2 = (S+L)^2 = S^2 + 2SL + L^2 \quad (23)$$

Substituting the respective right-hand members of Equations (22a) and (22b) for S and L, respectively, in Equation (23):

$$(A_M + A_I)^2 = S^2 + 2\sum_{n=0}^{\frac{N}{2}-1} b_n 2^{-n}[b_{N/2}2^{-N/2}] + \left(b_{\frac{N}{2}}\right)^2 2^{-N} \quad (24)$$

For the fractional values employed, $$b_{N/2} = 0 \text{ or } 1 \text{ and}$$

$$b^2_{N/2} = 0 \text{ or } 1$$

Therefore, $$b_{N/2} = b^2_{N/2}.$$

Accordingly, Equation (24) may be rewritten substituting $b_{N/2}$ for $b^2_{N/2}$:

$$(A_M + A_I)^2 = S^2 + 2\sum_{n=0}^{\frac{N}{2}-1} b_n 2^{-n}[b_{N/2}2^{-N/2}] + b_{N/2}2^{-N} \quad (25)$$

The right member of Equation (25) may be rearranged by factoring $b_{N/2}$ from the center term and further factoring $2^{-N/2}$ from all but the first term:

$$(A_M + A_l)^2 = S^2 + b_{N/2} 2 \times 2^{-N/2} \left[ \sum_{n=0}^{\frac{N}{2}-1} b_n 2^{-n} + \tfrac{1}{2} 2^{-N/2} \right] \quad (26)$$

By increasing the upper limit on the summation to $(N/2+1)$ so as to avoid the algebraic sum term in the bracket, and by introducing a c-notation, for convenience, Equation (26), itself, can be rewritten:

$$(A_M + A_l)^2 = [S^2] + b_{N/2} 2^{1-N/2} \sum_{n=0}^{N/2+1} c_n 2^{-n} \quad (27)$$

where
$c_n = b_n$ for $n = 0, 1, 2, \ldots (N/2) - 1$
$c_n = 0$ for $n = N/2$
$c_n = 1$ for $n = (N/2) + 1$.

The bracketed $S^2$ term is read-out of a $2^{N/2}$ word$\times$N bits per word ROM for the center ROM (illustrated in FIG. 7 for N=16), while the remainder or correction term of Equation (27) is implemented by the above-described cooperation of elements 41, 42 and 43 in FIG. 7, whereby the LSB (or $b_{N/2}$) output of element 14 is fed to gate 41, and the LSB (or N/2+1) of the (N/2)+2) line input to gate 41 is biased as a "1" input, the next least significant bit line (n=N/2) is biased as "0". Such abbreviation of the central ROM by means of elements 41, 42 and 43 in FIG. 7 may be alternately achieved by the rearrangement shown in FIG. 10.

Figure 10:
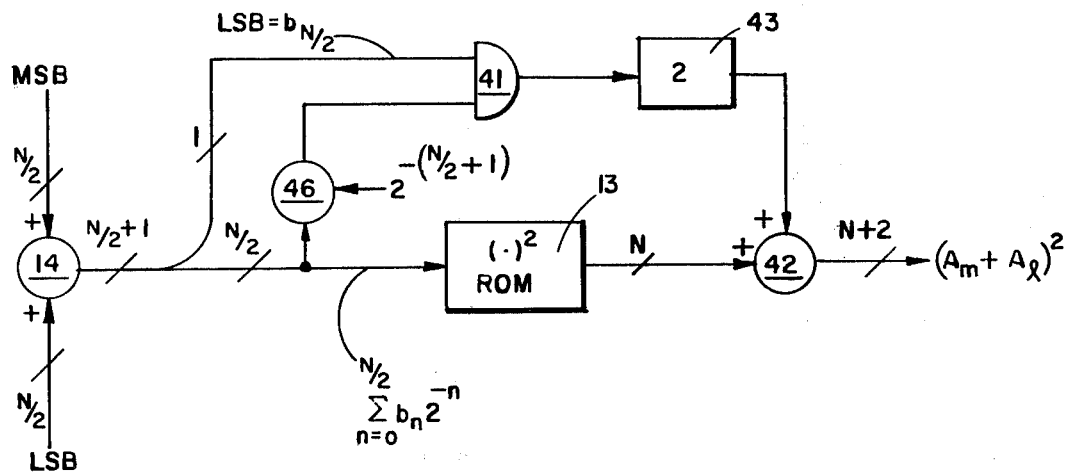
FIGS. 10 and 11 are block diagrams of alternate embodiments of the concept for reducing the size of the central ROM

Referring to FIG. 10, there is shown an alternate arrangement of the ancillary logic associated with the central ROM of FIG. 7, whereby such ROM may be abbreviated to the same size as the other two ROM's. In such alternate arrangement, the LSB line of the output of element 14 is fed to gate 41, as before. However, gain element 43 is interposed at the output of gate 41 and is implemented as a gain doubler, and an adder 46 interposed at the N/2 lines input to gate 41 for adding the bias $2^{-(N/2+1)}$. In this way also the bias input lines $C_{N/2}=0$ and $C_{N/2+1}=1$ (of FIG. 7) are replaced.

Figure 11:
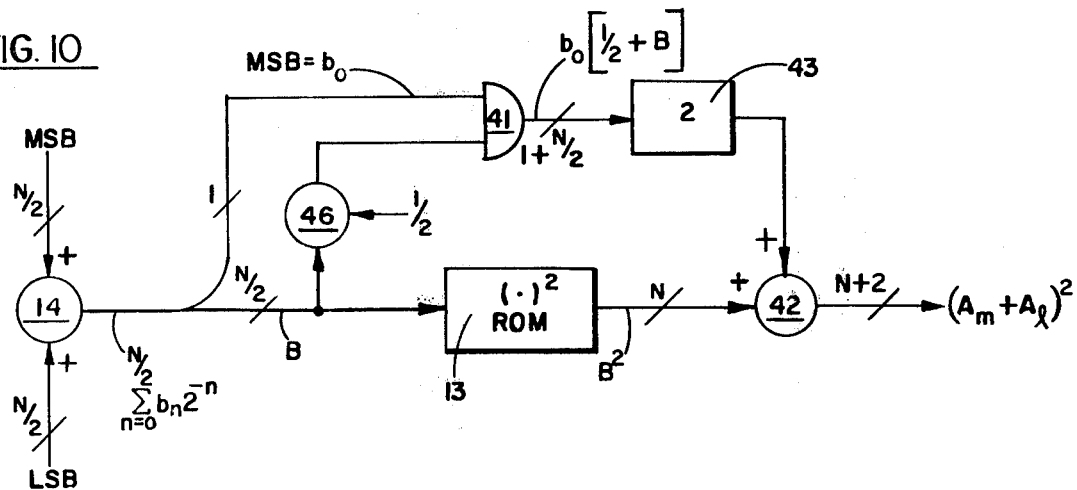

A further alternate arrangement for abbreviating the requirements of the central ROM 13 of FIG. 9 is shown in FIG. 11 and is thus explained: Ancillary logic elements 41, 42, 43 and 36 (from FIG. 10) are employed in the arrangement of FIG. 11, but with certain differences. The MSB line of the output from element 46 is fed directly to gate 41 (rather than the LSB line as in FIG. 10). Also, the bias term injected into the 1-bit digital combiner 46 of FIG. 11 is $\tfrac{1}{2}$ (rather than the $2^{-(N/2+1)}$ value in FIG. 10).

The output of element 14 in FIG. 11 may be treated as follows:

$$A_M = A_l = \sum_{n=1}^{N/2} (a_n + a_{n+N/2}) 2^{-n} \quad (28)$$

The consequence of such addition, as explained above, is an additional bit in the output of combiner 14:

$$A_M + A_l = \sum_{n=0}^{N/2} b_n 2^{-n} = b_0 + B \quad (29)$$

where: $b_0$ = an initial bit and $$B = \sum_{n=1}^{N/2} b_n 2^{-n}.$$

Considering the desired square function output required of the ROM 13:

$$(A_M + A_l)^2 = (b_0 + B)^2 = b_0^2 + 2b_0 B + B^2 \quad (30)$$

Now, then,
$b_0 = 1$ or $0$.

Therefore,
$b_0^2 = 1$ or $0$

Accordingly:

$$b_0 = b_0^2 \quad (31)$$

Substituting Equation (31) in the right side of Equation (30):

$$(b_0 + B)^2 = b_0 + 2b_0 B + B^2 \quad (32)$$

Factoring and rearranging the right hand member of Equation (32):

$$(b_0 + B)^2 = 2b_0[\tfrac{1}{2} + B] + B^2$$

where:
B = the square function ROM input
$B^2$ = the square function ROM output
$2b_0[\tfrac{1}{2} + B]$ = the correction provided by the ancillary logic elements.

Thus, it is to be appreciated from FIGS. 7, 10 and 11 that ancillary logic has been disclosed for abbreviating or shrinking the size of the central, or sum-of-the-parts, ROM 13 to that of the concatenating ROM's 11 and 12 (in FIG. 9). Such ancillary logic comprises a coincidence gate responsive to an end bit (i.e., MSB or LSB) output of element 14 and a preselectively biased balance of the output of element 14, the digital output of which gate is doubled, and the doubled output additively combined with the output of the square function means or ROM 13, the input of the ROM being responsively coupled to the output balance of element 14.

Thus, there has been disclosed the application of two's complement fractional value data to a novel square by parts, technique to effect a quarter-square multiplier, the arrangements of FIGS. 6, 7 and 8 including means for abbreviating or reducing the overall memory requirements therefor. The arrangement of FIG. 6 avoids any increase or doubling of memory requirement which would otherwise need be included due to the two's-complement sign bit. The arrangement of FIG. 7 reduces or abbreviates the required size of the control ROM of the three-ROM square-by-parts device to the same size as the other two ROM's, whereby a single standard-size ROM may be used. The arrangement of FIG. 8 effects a significant abbreviation in the required size of such standard ROM. The economies achieved by the ancillary logic elements employed to effect such abbreviations far exceed the nominal cost of such minor additions to the mechanization.

Consider, now, the advantages provided by the feature of square-by-parts, and each of the above-noted memory abbreviation features for representative parallel inputs of 8, 12, 16 and 20 bit inputs. The memory requirement for a look-up table of products of two numbers of N bits each is $(2^{2N}-1)$ words$\times(2N-1)$ bits per word, while the like requirement for a quarter-square type multiplier is $[(2^{N+1}-1)$ words$\times(N-2)$ bits/word] 2 memories. The memory requirements for the substitution of the disclosed two-part square-by-parts device in a quarter square type multiplier is $$2[(2^{N/2}-1)2N+(2^{N/2+1}-1)(N+2)].$$

The memory requirement for a square-by-parts type quarter square multiplier in which accommodations are included to employ a standard ROM is $6N(2^{N/2}-1)$, while the memory size for such multiplier in which the standard ROM is further abbreviated as $6(N-4)(2^{N/2}-1)$.

Utilizing the above indicated relationships for various numbers of parallel inputs (word sizes), the relative total memory capacity required by the various types of multipliers discussed above, including embodiments of various features of the disclosed invention, may be demonstrated by means of the below listed Table I. A review of Table I makes clear how quickly such memory capacity increases as the word size N or the number of parallel inputs increases, and how substantially the various aspects of the disclosed invention pare down or reduce such memory requirements.

Accordingly, there has been described highly efficient and economic digital-arithmetic devices utilizing ROM's in a fully parallel arrangement for high-speed operation. Because of the improved efficiency and economy provided by such devices, high-speed digital-data-processing applications of the invention may be utilized to update the quality and sophistication of a number of data processing and signalling systems. Such areas of application include but are not limited to: modems, commercial image processing such as fingerprint-identification systems, television-image enhancement including "ghost" removal and image-edge enhancement, vibration analyzers and other forms of spectral density analysis including applications to FFT type devices, and commercial aircraft VOR navigation aids.

Therefore, improved and highly useful digital arithmetic devices have been disclosed. Although the invention has been described and illustrated in detail, it is to be clearly understood that the same is by way of illustration and example only and is not to be taken by way of limitation, the spirit and scope of the invention being limited only by the terms of the appended claims.

I claim:

1. A ROM-based fully parallel digital arithmetic device (of N parallel inputs) comprising in combination:
   a plurality of at least three square-function ROM's, each having a read address and a read-out,
   a read address of a first one of said plurality of ROM's being responsively coupled to a most significant bits part of a N-bit parallel input of said digital device,

TABLE I

| Type of Multiplication | N → 8 | 12 | 16 | 20 |
|---|---|---|---|---|
| Single Look-up Type Memory $(2^{2N}-1)(2N-1)$ | 983,025 | $3.85875 \times 10^8$ | $1.33143 \times 10^{11}$ | $4.28809 \times 10^{13}$ |
| Quarter Square Multiplier (FIG. 2) $2 \times (2^{N+1}-1) \times 2N = 4N(2^{N+1}-1)$ | 16,352 | 393,168 | 8,388,544 | $1.67772 \times 10^8$ |
| Square Sign Corrected (FIG. 6) $4N(2^N-1)$ | 8,160 | 196,560 | 4,194,240 | 83,886,000 |
| Square by Parts Type Quarter Square (FIG. 3) $\left[\left(2^{\frac{N}{2}}-1\right)2N + \left(2^{\frac{N}{2}+1}-1\right)(N+2)\right] \times 2$ | 1,100 | 6,580 | 34,716 | 171,908 |
| Standardized ROM (FIGS. 6 & 7) $6N\left(2^{\frac{N}{2}}-1\right)$ | 720 | 4,536 | 24,480 | 122,760 |
| Reduced Output Work Storage for Standardized ROM (FIGS. 6, 7 & 8) $6(N-4)(2^{N/2}-1)$ | 360 | 3,024 | 18,360 | 98,208 | a read address of a second one of said plurality of ROM's being responsively coupled to at least significant bits part of said parallel input of said digital device, a read address of a third ROM being responsively coupled to a combination of parts of said parallel input;

gain-scaled digital combining means responsively coupled to the read-outs of said square function ROM's to provide an output indicative of the square, $C^2$, of a value C corresponding to an applied parallel digital input to said device.

2. The device of claim 1 in which said ROM's are of mutual like-size memory, and in which ancillary logic is included for cooperation with said third ROM and comprises:

a coincidence gate having one input responsive to an end bit of said combination of parts of said parallel input and further having a second input responsive to a preselectively biased balance of said combination of parts of said parallel input;

means for doubling the digital value of the output of said gate; and means for additively combining said doubled output with the output of said third ROM.

3. The device of claim 2 in which a first input of said coincidence gate is responsive to a least significant bit of said combination of parts of said parallel input and in which said preselectively biased balance of said combination of parts is biased in the amount of $2^{-(N/2+1)}$.

4. The device of claim 2 in which a first input of said coincidence gate is responsive to a most significant bit of said combination of parts of said parallel input and in which said preselectively bias balance of said combination of parts is biased in the amount of $\frac{1}{2}$ or $2^{-1}$.

5. The device of claim 1 in which there is included ancillary logic associated with at least one of said ROM's and comprising:

the interconnection of a least significant bit input of a parallel input line and a least significant bit output of a parallel output line;

the grounding of a next least significant bit output of said parallel output line;

an exclusive OR gate having a first and second input responsively coupled to a next least significant bit input of said parallel input line and further having a second input responsively coupled to a second next least significant bit input of said parallel input;

a first coincidence or AND gate having a respective first and second input coupled to the least significant bit input and next least significant bit input, respectively, of said parallel input line to provide an output in response to the coincidence state of a non-occurrence of a least significant bit and an occurrence of a next least significant bit; and a second coincidence or AND gate having a respective first and second input coupled to said least significant bit input and the output of said OR gate, respectively, a fourth least significant output of said parallel output line being coupled to the output of said second coincidence gate, and a third least significant bit output of said parallel output line being coupled to the output of said first coincidence gate.

6. In a digital parallel square function data processor having a parallel N word input and a parallel 2N bit output for providing an output corresponding to the square of the value of an input address applied thereto, the combination comprising:

a square function ROM having an address input responsive to said parallel input and further having a read-out coupled to said parallel output but for the four least significant bit output lines ($b_{2N}$, $b_{2N-1}$, $b_{2N-2}$, $b_{2N-3}$) of said output;

an exclusive-OR gate having a respective first and second input coupled to a respective one of said next least significant bit and second next least significant bit input lines ($a_{N-1}$ and $a_{N-2}$) respectively;

a first coincidence or AND gate having a respective first and second input coupled to a respective one of said least significant bit input line ($a_N$) and an output of said exclusive OR gate; and a second coincidence or AND gate having a respective first and second input responsively coupled to a respective one of least significant bit and second least significant bit ($a_N$ and $a_{N-1}$) input lines for providing an output indicative of the coincidence of $\bar{a}_N \cdot a_{N-1}$, said least-significant-bit lines ($a_N$ and $b_{2N}$) being interconnected and a next least significant bit output line ($b_{2N-1}$) being grounded; a respective one of a second and third next least significant output bit ($b_{2N-2}$ and $b_{2N-3}$) output line being responsively connected to a respective output of said second and first coincidence gates.

7. A digital parallel square-function data processor having a parallel N-bit word input and a parallel 2N-bit output for providing an output corresponding to the square of the value of an input address applied thereto, the combination comprising:

a square function ROM having an address input responsive to said parallel input, and further having a read-out coupled to said parallel output but for two output lines of said parallel output;

a coincidence gate having one input responsive to an end bit of a combination of parts of said parallel input and further having a second input responsive to a preselectively biased balance of said combination of parts of said parallel input;

means for doubling the digital value of the output of said gate; and means for additively combining said doubled output with the output of said third ROM.

8. A ROM-based fully parallel digital arithmetic device (of N parallel inputs) for obtaining the square, $C^2$, of a value, C, and comprising:

a first, second and third square function ROM, each having a read address and a read-out, a read address of said first ROM being responsively coupled to the most-significant-bits half of a N-bit parallel input of said digital device, a read address of said second ROM being responsively coupled to the least significant bits half of said parallel input of said digital device, a read address of said third ROM being responsive to the sum of said most significant bits half and said least significant bits half of said parallel input of said arithmetic device; and second and third digital combining means, each having a first, second and third input and an output, said inputs of said second digital combining means being responsively coupled to said ROM's, whereby the output of said second digital combining means is indicative of the difference between the output of said third ROM and the sum of the outputs of said first and second ROM's, said inputs of said third digital combining means being respectively coupled to the outputs of said first and second ROM and of said second digital combining means.

9. A ROM-based fully parallel digital arithmetic-device (of N parallel inputs) of the quarter-square multiplier type having a first and second square function generator, for obtaining the product AB of a first and second value, A and B, respectively, each said square function generator comprising:

a first, second and third square-function ROM, each having a read address and a read-out,
 a read address of said first ROM being responsive to the most significant bits half of a N-bit parallel input of said digital device,
 a read address of said second ROM being responsive to the least significant bits half of said parallel input of said digital device,
 a read address of said third ROM being responsive to the sum of said most-significant-bits half and said least-significant-bits half of a parallel input to said square function generator; and first and second digital combining means, each having a first, second and third input and an output,
 a respective one of said inputs of said first digital combining means being responsive to said ROM's for providing an output indicative of the difference between the output of said third ROM and the sum of the outputs of said first and second ROM's,
 said second digital combining means being input coupled to the outputs of said first and first ROM and of said second digital combining means to provide an output indicative of the sum of the inputs thereto.

10. The device of claim 9 in which there is further included first and second means for gain scaling the inputs to said second digital combining means from said first ROM and said first digital combining means,
 said first means gain-scaling said input from said first ROM by the factor $2^N$; and
 said second means gain-scaling said input from said first digital combining means by the factor $2^{N/2}$.

11. The device of claim 9 in which there is further included first and second means for attenuating the inputs to said second digital combining means from said second ROM and said first digital combining means,
 said first means attenuating said input from said second ROM by the factor $2^{-N}$; and
 said second means gain-scaling said input from said first digital combining means by the factor $2^{-N/2}$.

12. A ROM-based fully parallel digital arithmetic device (of N parallel inputs) of the quarter square multiplier type having a first and second square function generator, for obtaining the product AB of a first and second value, A and B, respectively, each said square function generator comprising:

first, second and third digital combining means,
a first, second and third square function ROM, each having a read address and a read-out,
 a read address of said first ROM and a first input of said first digital combining means being responsively coupled to the most significant bits half of a N-bit parallel input of said digital device,
 a read address of said second ROM and a second input of said first digital combining means being responsively coupled to the least significant bits half of said parallel input of said digital device,
 a read address of said third ROM being responsively coupled to said output of said first digital combining means; and each of said second and third digital combining means having a first, second and third input and an output,
 a respective one of said inputs of said second digital combining means being responsively coupled to a respective one of said ROM's, whereby the output of said second digital combining means is indicative of the difference between the output of said third ROM and the sum of the outputs of said first and second ROM's,
 said first, second and third inputs of said third digital combining means being respectively coupled to the outputs of said first and second ROM and of said second digital combining means, respectively, to provide an output indicative of the sum of said inputs thereto.

13. The device of claim 12 in which there is further included first and second means for gain scaling the inputs to said third digital combining means from said first ROM and said second digital combining means,
 said first means gain-scaling said input from said first ROM by the factor $2^N$; and
 said second means gain-scaling said input from said second digital combining means by the factor $2^{N/2}$.

14. The device of claim 12 in which there is further included first and second means for attenuating the inputs to said third digital combining means from said second ROM and said second digital combining means,
 said first means attenuating said input from said second ROM by the factor $2^{-N}$; and
 said second means gain-scaling said input from said second digital combining means by the factor $2^{-N/2}$.

15. A ROM-based fully parallel digital arithmetic device (of N parallel inputs) of the quarter square multiplier type having a first and second square function generator, for obtaining the product AB of a first and second value, A and B, respectively, and first, second, and third digital combining means, each said square function generator comprising:

a first, second and third square function ROM, each having a read address and a read-out,
 a read address of said first ROM and a first input of said first digital combining means being respectively coupled to the most significant bits half of a N-bit parallel input of said digital device,
 a read address of said second ROM and a second input of said first digital combining means being responsively coupled to the least significant bits half of said parallel input of said digital device,
 a read address of said third ROM being responsively coupled to said output of said first digital combining means; and each of said second and third digital combining means having a first, second and third input and an output,
 a respective one of said inputs of said second digital combining means being responsively coupled to a respective one of said ROM's, whereby the output of said second digital combining means is indicative of the difference between the output of said third ROM and the sum of the outputs of said first and second ROM's,
 said first, second and third inputs of said third digital combining means being respectively coupled to the outputs of said first and second ROM and of said second digital combining means, respectively, to provide an output indicative of the sum of said inputs thereto.

16. The device of claim 15 in which there is included first, second and third means for commonly attenuating the inputs to said third digital combining means from said first and second ROM's and said second digital combining means, by the factor $2^{-2}$.

17. The device of claim 15 in which there is further included first, second and third means for gain-scaling the inputs to said third digital combining means from said first and second ROM's and said second digital combining means, said first means gain-scaling said input from said first ROM's by the factor $2^{N-2}$;

said second means gain-scaling said input from said second digital combining means by the factor $2^{N/2-2}$, and said third means gain-scaling said input from said second ROM's by the factor $2^{-2}$.

18. The device of claim 15 in which there is further included first, second and third means for gain-scaling the inputs to said third digital combining means from said first and second ROM's and said second digital combining means, said first means gain-scaling said input from said first ROM's by the factor $2^{-2}$;

said second means gain-scaling said input from said second digital combining means by the factor $2^{-N/2-2}$; and said third means gain-scaling said input from said second ROM's by the factor $2^{-N-2}$.

19. A ROM-based fully parallel digital arithmetic device (of N parallel inputs) of the quarter-square multiplier type having a first and second square-function generator, for obtaining the product AB of a first and second value, A and B, respectively, each said square-function generator comprising:

A first digital combining means having a first and second input and an output, a first, second and third square function ROM, each having a read address and a read-out, a read address of said first ROM and a first input of said first digital combining means being responsively coupled to the most-significant-bits half of a N-bit parallel input of said digital device, a read address of said second ROM and a second input of said first digital combining means being responsively coupled to the least-significant-bits half of said parallel input of said digital device, a read address of said third ROM being responsively coupled to said output of said first digital combining means; and second and third digital combining means, each having a first, second and third input and an output, said first input of said second and third digital combining means being responsively coupled to the outputs of said first ROM of each of said first and second square function generators, said second input of said second and third digital combining means being responsively coupled to the outputs of said second ROM of each of said square function generators, and said third input of said second digital combining means being responsively coupled to the outputs of said third ROM of each of said first and second square function generators, whereby the output of said second digital combining means is indicative of the difference between the outputs of said third ROM's and the sum of the outputs of said first and second ROM's, and said third input of said third digital combining means being responsively coupled to the output of said second combining means, whereby the output of said third digital combining means is indicative of the sum of the applied inputs thereto.

20. A ROM-based fully parallel digital arithmetic device (of N parallel inputs) for obtaining the square, $C^2$, of a value, C, and comprising:

first digital combining means having a first and second input and an output, a first, second and third square function ROM, each having a read address and a read-out, a read address of said first ROM and a first input of said first digital combining means being responsively coupled to the most significant bits half of a N-bit parallel input of said digital device, a read address of said second ROM and a second input of said first digital combining means being responsively coupled to the least significant bits half of said parallel input of said digital device, a read address of said third ROM being responsively coupled to said output of said first digital combining means; and second and third digital combining means, each having a first, second and third input and an output, said inputs of said second digital combining means being responsively coupled to said ROM's, whereby the output of said second digital combining means is indicative of the difference between the output of said third ROM and the sum of the outputs of said first and second ROM's, said inputs of said third digital combining means being respectively coupled to the outputs of said first and second ROM and of said second digital combining means.

21. The device of claim 20 in which there is further included first and second means for gain-scaling the inputs to said third digital combining means from said first ROM and said second digital combining means, said first means gain-scaling said input from said first ROM by the factor $2^N$; and said second means gain-scaling said input from said second digital combining means by the factor $2^{N/2}$.

22. The device of claim 20 in which there is further included first and second means for attenuating the inputs to said third digital combining means from said second ROM and said second digital combining means, said first means attenuating said input from said second ROM by the factor $2^{-N}$; and said second means gain-scaling said input from said second digital combining means by the factor $2^{-N/2}$.

23. A ROM-based fully parallel digital arithmetic device (of N parallel inputs) for obtaining the square, $C^2$, of a value, C, and comprising:

first, second and third digital combining means having at least a first and second input and an output; and a first, second and third square function ROM, each having a read address and a read-out, a read address of said first ROM and a first input of said first digital combining means being responsively coupled to the most significant bits half of a N-bit parallel input of said digital device, a read address of said second ROM and a second input of said first digital combining means being responsively coupled to the least significant bits half of said parallel input of said digital device, a read address of said third ROM being responsively coupled to said output of said first digital combining means;

said second digital combining means being responsively coupled to said ROM's to provide an output indicative of the difference between the output of said third ROM and the sum of the outputs of said first and second ROM's, and said third digital combining means being responsively coupled to provide an output indicative of the sum of the outputs of said first and said second ROM's and of said second digital combining means.

* * * * *

UNITED STATES PATENT AND TRADEMARK OFFICE
CERTIFICATE OF CORRECTION

PATENT NO. : 4,313,174
DATED : January 26, 1982
INVENTOR(S) : Stanley A. White

It is certified that error appears in the above—identified patent and that said Letters Patent is hereby corrected as shown below:

Column 15, line 29, "first" (second occurrence) should read -- second --.

Column 15, line 30, "second" should read -- first --.

Signed and Sealed this

Twenty-fifth Day of May 1982

[SEAL]

*Attest:*

*Attesting Officer*

GERALD J. MOSSINGHOFF
*Commissioner of Patents and Trademarks*